(12) United States Patent
von Düring

(10) Patent No.: US 6,808,843 B2
(45) Date of Patent: Oct. 26, 2004

(54) BATTERY, ESPECIALLY FLAT CELL

(75) Inventor: Bodo von Düring, Lucerne (CH)

(73) Assignee: Elion AG, Lucerne (CH)

( * ) Notice: Subject to any disclaimer, the term of this patent is extended or adjusted under 35 U.S.C. 154(b) by 57 days.

(21) Appl. No.: 10/049,757

(22) PCT Filed: Jun. 7, 2001

(86) PCT No.: PCT/CH01/00353

§ 371 (c)(1),
(2), (4) Date: Jul. 16, 2002

(87) PCT Pub. No.: WO01/97315

PCT Pub. Date: Dec. 20, 2001

(65) Prior Publication Data

US 2003/0031925 A1 Feb. 13, 2003

(30) Foreign Application Priority Data

Jun. 14, 2000 (CH) .............................................. 1193/00

(51) Int. Cl.$^7$ .............................. H01M 6/10; H01M 4/40
(52) U.S. Cl. .................... 429/162; 429/94; 429/231.95; 429/127
(58) Field of Search ..................... 429/162, 94, 231.95, 429/127, 124

(56) References Cited

U.S. PATENT DOCUMENTS

| 4,761,352 A | * | 8/1988 | Bakos et al. | ................... 429/94 |
| 5,300,373 A | | 4/1994 | Shackle | |
| 5,683,834 A | * | 11/1997 | Fujimoto et al. | ........... 429/218 |
| 5,958,088 A | | 9/1999 | Vu et al. | |

OTHER PUBLICATIONS

Patent Abstracts of Japan, vol. 12, No. 447, JP 63–174271, Jul. 1988.

* cited by examiner

Primary Examiner—Carol Chaney
Assistant Examiner—Angela J. Martin
(74) Attorney, Agent, or Firm—Beyer Weaver & Thomas, LLP

(57) ABSTRACT

Battery, especially flat cell, comprising an electrode of lithium-metal or lithium-alloy, an electrode containing an active material intercalating lithium ions, a separator between both electrodes, and a housing enclosing the electrodes and the separator with connector tabs for both electrodes, wherein at least one of the electrodes (1; 2; 3) is a multi-layer body built by multiple folds and an equal layer-thickness of the active material (4; 12; 13) between the folded layers.

14 Claims, 2 Drawing Sheets

Figure 1:
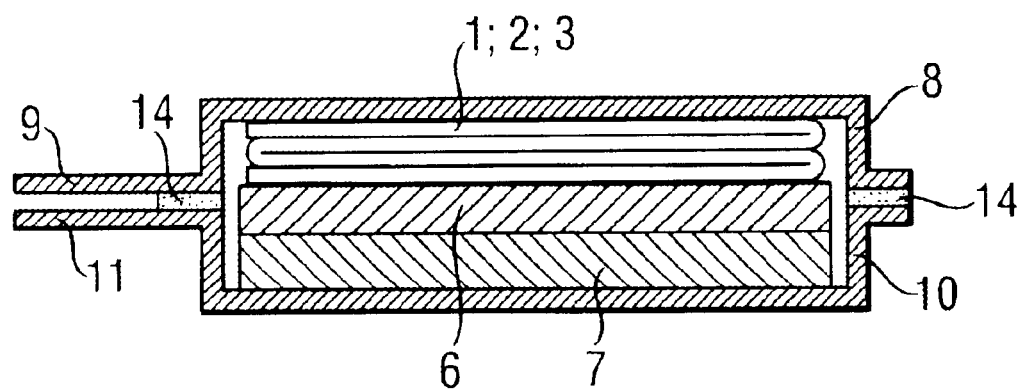

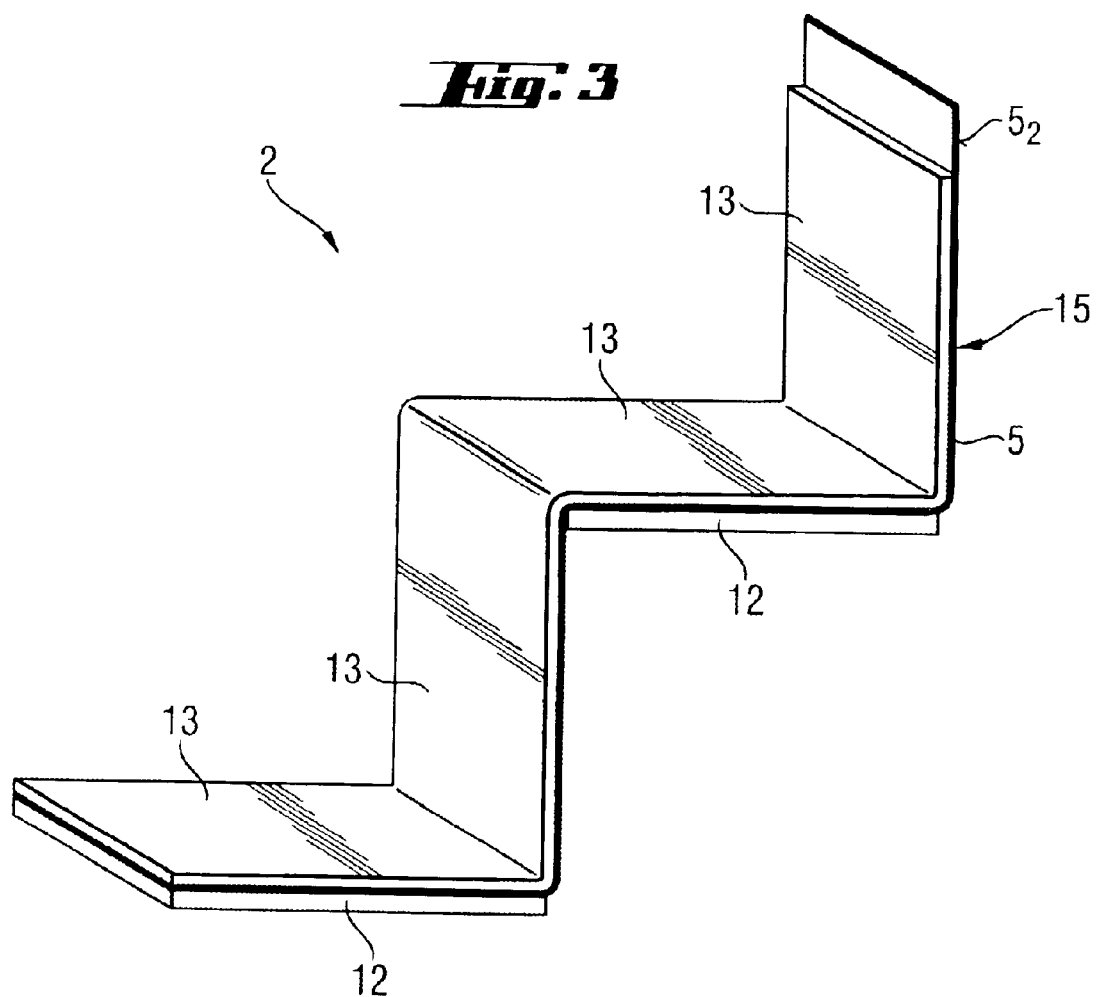
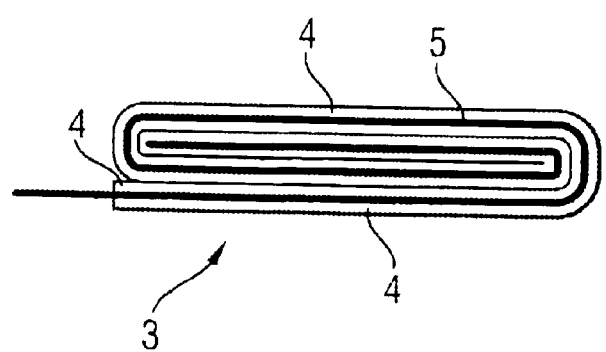

BATTERY, ESPECIALLY FLAT CELL

The presented invention relates to a battery, especially a flat cell, comprising a first electrode of lithium-metal or lithium-alloy, a second electrode of an active material intercalating lithium-ions, a separator between both electrodes and a housing with electrical connections enclosing the electrodes and the separator.

The prevailing problem with this type of batteries is to efficiently discharge or recharge the electrode with the active material due to the limited quantity of the active material available. In order to improve the electrical conductivity of the electrode it was suggested (U.S. Pat. No. 5,470,357) to laminate this electrode with an electrical connection. This solution, however, only results in a gradual improvement of battery performance. With the existing batteries of this kind one also has a conflicting situation between the current capacity and the run-time of the cell insofar as an increase of run-time necessitates an increase of electrode mass. Conversely, an increased electrode mass has a negative effect on ion-mmigration (longer distances) and therefore on internal resistance of the electrode.

U.S. Pat. No. 5,219,673 describes a battery where the battery cell is formed by a coiled multi-layer body. Here also one has the general conflict that the electrodes cannot have a desired bigger mass as the ion-migration within this mass would lead to an increase of the internal resistance.

U.S. Pat. No. 4,830,940 describes a battery where the anode is built as an elongated strip folded multiple times in order to accommodate cathode plates within the separate folds. Thus a compact cell is built and lodged in a common housing. The cathodes and the wound around anode are provided with connector-tabs at different locations. The multi-layer design increases the internal resistance of the cell, however.

The object of the present invention is to present a battery of the type described above in which
- electrical conductivity and recharging are considerably improved,
- internal resistance of the electrodes is optimized,
- current capacity is increased and
- run-time is extended.

According to the present invention, these objectives are reached by the fact that at least one of the electrodes (1; 2; 3) is a multi-layer body built by multiple folds and by an equal layer-thickness of the active material (4; 12; 13) between the folded layers. This way the electrode carrier material permeates the active material multiple times. This results in an optimized internal resistance within the active material layers (improved ion-migration) comprised within the different folds. In the same time, current capacity of the cell built according to the invention will be improved due to a significant increase of the electrode surface area. Furthermore, the run-time of the cell is considerably increased because of the much bigger amount of active material available within the electrode.

According to a preferred embodiment of the invention the folding pattern is a Leporello (zig-zag)-fold. In this context it is advantageous, according to the invention, that a carrier material (5) permeable for ions is coated with active material (4) of equal layer-thickness on both sides.

This way the overall thickness of active material between the folds of the Leporello-fold always is equal. This, in turn, ensures homogeneous current distribution. Within the scope of the invention, it is also possible that the Leporello is coated on both sides with layers of active material of different coating thickness. In this case it is advantageous that the Leporello is coated on one of its sides with a thin layer of active material and on its other side with a thick layer of active material (12) on every other fold. A thickness-ratio of 1:2 will result again in equal overall thickness of active material between the folds of the Leporello.

Further details, features and advantages of the invention will appear from the following description in combination with the attached drawings of potential embodiments of the invention. In these drawings:

FIG. 1 general schematic of battery design according to invention

Figure 2:
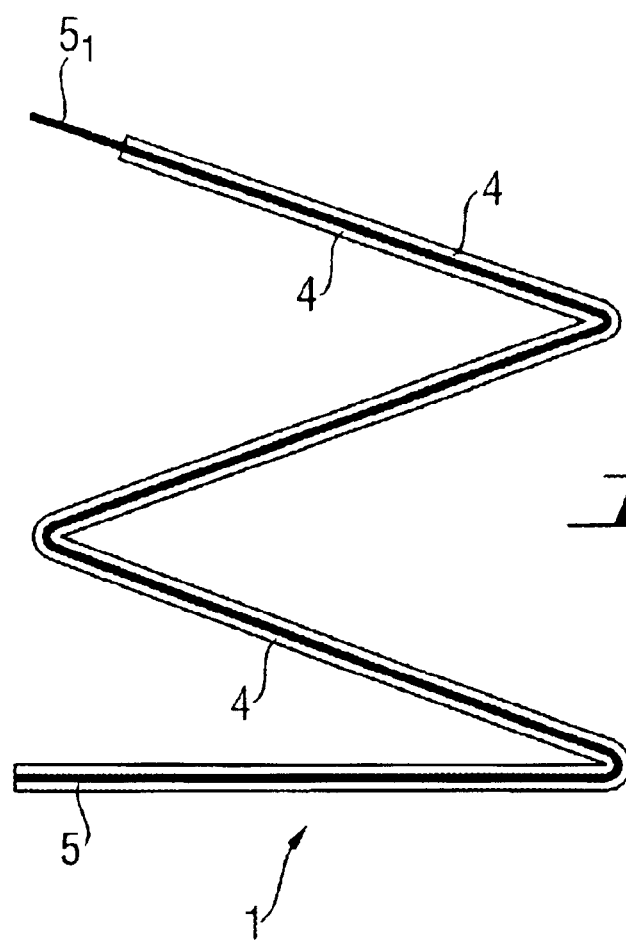

FIG. 2 one possible electrode design according to invention

FIG. 3 another possible electrode design according to invention

FIG. 4 depicts (in general) a folded electrode

The battery in FIG. 1, according to the invention, comprises a housing member 8 accommodating a first electrode 1, 2, 3 i.e. in a lithium intercalating material, a housing member 10 accommodating the other electrode 7, made i.e. from a Lithium-metal or it's alloys, and a separator 6 located between the two electrodes. The two housing members 8 and 10 include electrical tabs (not shown) and are appropriately joined and insulated in 14. At least one of the electrodes 1, 2, 3 is made according to the invention.

In the embodiment described in FIG. 2 electrode 1 comprises a carrier body 5 serving as electrical conductor. This carrier body 5 is permeable by ions and, as commonly known, made from metal film, expanded metal, metal grid, electrically conductive perforated film, fleece material, or synthetic foam; it is coated on both sides with active material 4 of equal layer thickness. According to the invention, it is advantageous if the electrode 1 comprising the carrier body 5 for the lithium intercalating active material 4 is folded as a Leporello and is coated as shown in FIG. 2 with equal layer thickness of the active material 4 on both sides. According to the invention, the performance of electrode 1 is considerably improved by the fact that the total active material is penetrated several times as a consequence of the folding of the carrier body 5, as, by that means, a multiple layer body is built in which the distances between the various folding flaps of the Leporello are equal. This is reached in a particularly advantageous manner when the layer thickness of the active material 4 is equal on both sides of the Leporello.

With the embodiment of the invention shown in FIG. 3 the same result can be achieved when the layer thickness of the active material is different on both sides of the carrier body 5 forming the Leporello. In this embodiment, on side of the Leporello is coated with a thin layer of active material 13 while the other side has a thick coating of active material 12 for every other fold of the Leporello. In this embodiment the thin layer 13 is half as thick as the thick layer 12 so that, when folding the Leporello, the resulting overall layer thickness of active material between the folds of the Leporello is equal.

Especially in flat cells the number of folds of the Leporello is limited. According to the invention it is already advantageous if the multi-layer body built by the Leporello presents only two folds. It is particularly advantageous, however, if the Leporello presents four folds or more with a layer thickness of active material between 25 $\mu$m and 150 $\mu$m. A layer thickness between 40 $\mu$m and 110 $\mu$m is preferred. Nevertheless, the overall thickness of electrode 1 using the folded multi-layer pattern of the battery according to the invention, should be less than 500 $\mu$m.

The particular benefit of the battery according to the invention is the increased capacity of the battery during discharging and charging as a result of the decrease of ion migration distance within the active material 4, 12, 13. Furthermore, mechanical electrode 1, 2, 3 stability and subsequently battery stability are improved by the multi-layered pattern created by the folds.

The battery according to the invention is by no means limited to the embodiments shown but also includes any other realization of the inventive idea expressed in claim 1.

Electrode 3 can, for instance, be realized by coil folding as shown in FIG. 4 with any number of windings. In case the battery according to the invention does not show a flat form, it is also possible to realize the electrode 3 as a coil. Without leaving the scope of the invention it is also possible to realize the multi-layer body as a combination of a coil and a Leporello folding. The carrier material 5 is not limited to the ribbon-shape shown in the figures. It can also present a L or cross shape with equal layer thickness of the active material 4 on both sides of the carrier material 5.

Without leaving th scope of the invention it is also possible to coat the surface of the active material with a compatible adhesive material to create a firm bond between adjacent layers when folding. A multi-layered electrode utilizing this feature has improved self-support and contributes to the mechanical stability of the battery altogether.

Furthermore it is advantageous if the first fold 15 of the carrier material is not coated with active material and directly connected to the battery housing or its electrical tab. It is also possible, however, that the carrier material 5 is extended in $5_1$ or $5_2$ at least on one end for an electrical contact with the housing element 8.

What is claimed is:

1. A battery, comprising an electrode of lithium-metal or lithium-alloy, an electrode containing an active material intercalating lithium ions, a separator between both electrodes, and a housing enclosing the electrodes and the separator with connector tabs for both electrodes, characterized by the fact that at least one of the electrodes is a multi-layer body built by multiple folds and by an equal layer-thickness of the active material between the folded layers such that the active material is in contact with itself between two consecutive folds so as to build a homogeneous layer of equal thickness between the folded layers.

2. A battery according to claim 1, wherein the folding is a Leporello (zig-zag)-folding.

3. A battery according to claim 1, wherein the folding is a coil folding.

4. A battery according to claim 1, wherein the electrode comprises a carrier material permeable for ions coated with active material of equal layer-thickness on both sides.

5. A battery according to claim 1, wherein the electrode comprises a carrier material permeable for ions coated with active material of having a different layer-thickness on each side.

6. A battery according to claim 5, wherein the carrier material is coated on one of its sides with a thin layer of active material.

7. A battery according to claim 5, wherein the carrier material is coated on its other side with a thick layer of active material on every other fold.

8. A battery according to claim 5, wherein the carrier material is coated on one of its sides with a thin layer of active material, and coated on its other side with a thick layer of active material on every other fold, and wherein the thickness of the thin layer coating of active material on one side of the carrier material is half the thickness of the thick layer coating of active material on the other side of the carrier material.

9. A battery according to claim 1, wherein the multi-fold body comprises at least two folds.

10. A battery according to claim 1, wherein the multi-fold body comprises at least four folds.

11. A battery according to claim 1, wherein the layer thickness of the active material is between 25 $\mu$m and 150 $\mu$m.

12. A battery according to claim 1, wherein the layer thickness of the active material is between 40 $\mu$m and 110 $\mu$m.

13. A battery according to claim 1, where the overall thickness of the folded, multi-layer body is less than 500 $\mu$m.

14. A battery, comprising an electrode of lithium-metal or lithium-alloy, an electrode containing an active material intercalating lithium ions, a separator between both electrodes, and a housing enclosing the electrodes and the separator with connector tabs for both electrodes, characterized by the fact that at least one of the electrodes is a multi-layer body built by multiple folds of carrier material carrying active material, wherein the active material is in contact with itself between two consecutive folds so as to build a homogenous layer of equal thickness between the folded layers.

* * * * *